United States Patent
Bolin

(10) Patent No.: US 9,294,881 B2
(45) Date of Patent: *Mar. 22, 2016

(54) METHOD FOR FINE LOCATION OF A MOBILE USER EQUIPMENT THAT IS THE RECIPIENT OF AN SMS IN A TELECOMMUNICATION NETWORK IMPLEMENTING OPEN-MODE FEMTOCELLS

(71) Applicant: FREE MOBILE

(72) Inventor: Paquito Bolin, Saint Gély du Fesc (FR)

(73) Assignee: FREE MOBILE, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/541,781

(22) Filed: Nov. 14, 2014

(65) Prior Publication Data

US 2015/0141051 A1 May 21, 2015

(30) Foreign Application Priority Data

Nov. 21, 2013 (FR) ...................................... 13 61445

(51) Int. Cl.
*H04W 24/00* (2009.01)
*H04W 4/02* (2009.01)
(Continued)

(52) U.S. Cl.
CPC ................ *H04W 4/028* (2013.01); *H04W 4/02* (2013.01); *H04W 4/14* (2013.01); *H04W 4/20* (2013.01); *H04W 8/08* (2013.01); *H04W 64/00* (2013.01); *H04W 8/14* (2013.01); *H04W 84/045* (2013.01)

(58) Field of Classification Search
CPC ......... H04W 4/02; H04W 4/028; H04W 8/12; H04W 4/021; H04W 64/00; H04W 4/20; H04W 4/14; H04W 8/08; H04W 84/045; H04W 8/14; G01S 5/02

USPC ................... 455/456.2, 456.1, 404.1; 370/328
See application file for complete search history.

(56) References Cited

U.S. PATENT DOCUMENTS

2006/0003775 A1* 1/2006 Bull ...................... G01S 5/0205
455/456.1
2008/0076420 A1* 3/2008 Khetawat ................ H04W 8/04
455/435.1

(Continued)

FOREIGN PATENT DOCUMENTS

EP 2 252 114 11/2010

OTHER PUBLICATIONS

Office Action mailed Aug. 19, 2015 in U.S. Appl. No. 14/535,572.
(Continued)

*Primary Examiner* — Mahendra Patel
(74) *Attorney, Agent, or Firm* — Nixon & Vanderhye, P.C.

(57) ABSTRACT

The present invention relates to a mobile network (10) organized into a plurality of location areas and service areas gathering a geographically homogeneous set of cells of the mobile network, with gathering of the femtocells into specific additional service areas. The arrival of an SMS intended to a user equipment (14) coupled to a femtocell (30) triggers a location step, with communication to the switching center of a rough location comprising the service area codes SAC and location area codes LAC corresponding to the femtocell, and of a fine location comprising unique data, such as IP address and INSEE code, of identification of the Internet box (20) associated to the femtocell. The femtocells may hence operate in open mode, each femtocell being able to be coupled to any user equipment registered with the mobile network operator.

5 Claims, 2 Drawing Sheets

Figure 1:
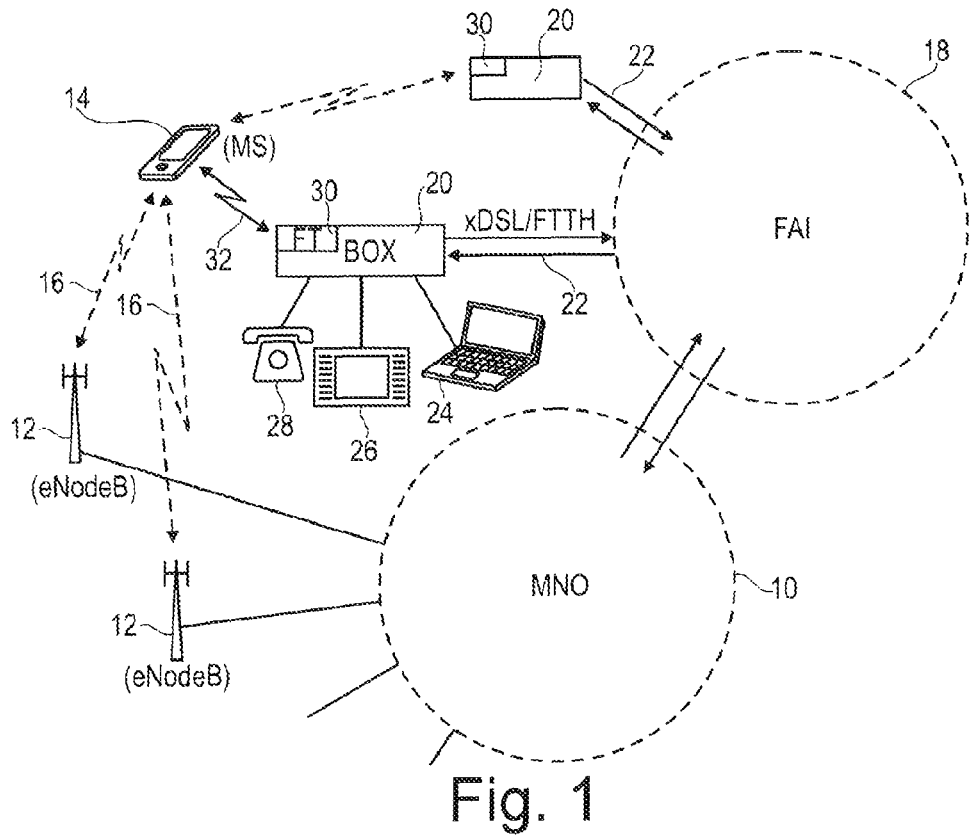

(51) Int. Cl.
  *H04W 4/14* (2009.01)
  *H04W 8/08* (2009.01)
  *H04W 4/20* (2009.01)
  *H04W 64/00* (2009.01)
  H04W 84/04 (2009.01)
  H04W 8/14 (2009.01)

(56) References Cited

U.S. PATENT DOCUMENTS

| | | | |
|---|---|---|---|
| 2010/0120447 A1* | 5/2010 | Anderson | H04W 64/003 455/456.1 |
| 2010/0135201 A1* | 6/2010 | Lewis | H04W 12/08 370/328 |
| 2010/0261448 A1* | 10/2010 | Peters | H04W 76/007 455/404.1 |
| 2011/0053609 A1 | 3/2011 | Choi-Grogan | |
| 2011/0086607 A1* | 4/2011 | Wang | H04M 3/5116 455/404.1 |
| 2013/0188783 A1* | 7/2013 | Boni | H04M 11/04 379/45 |
| 2013/0203373 A1* | 8/2013 | Edge | H04W 4/22 455/404.2 |

OTHER PUBLICATIONS

Search Report for FR 13 60886 dated Jun. 30, 2014, 2 pages.
Search Report for FR 13 61444 dated Jul. 22, 2014, 7 pages.
FR Search Report for FR 13 61445 dated Jun. 30, 2014, 2 pages.

* cited by examiner

METHOD FOR FINE LOCATION OF A MOBILE USER EQUIPMENT THAT IS THE RECIPIENT OF AN SMS IN A TELECOMMUNICATION NETWORK IMPLEMENTING OPEN-MODE FEMTOCELLS

The invention relates to the mobile communication networks implementing femtocells.

This application claims priority to FR Patent Application No. 13 61445 filed 21 Nov. 2013, the entire content of which is hereby incorporated by reference.

Femtocells are mobile phone relays of very low power and reduced range (at most a few meters or tens of meters) with which a mobile phone (MS, Mobile Station) can be coupled to pass and receive voice communications, emit or receive short messages (SMS), exchange digital data, etc.

Viewed from the mobile phone, the femtocell is functionally equivalent to a macrocell relay (base station BS or eNodeB), with the same functions of roaming, inter-cell handover, etc. In particular, when the mobile phone is in the coverage area of the femtocell, the handover is made automatically from the macrocellular antenna (of the external radio network) to that of the femtocell. Likewise, when the user leaves the coverage area of the femtocell, his phone finds seamlessly the macrocell network.

The specificity of a femtocell is that it is connected to a fixed terminal equipment of an Internet service provider, of the box type (called hereinafter "box" or "Internet box"), including a modem for interfacing to a wire-based IP link of the xDSL type or an optical-fibre link of the FTTH type, used to receive and emit the signals exchanged with the mobile phone coupled to the femtocell.

This technique thus uses two operators, i.e. the Mobile Network Operator (MNO) and the Internet Service Provider (ISP).

The interest of a communication via femtocells is multiple: firstly, this technique allows to serve areas where the radio coverage of the external macrocellular network is poor or very fluctuating, in particular inside houses due to the shielding effect of the surrounding superstructures; secondly, the load of the radio network is strongly reduced, because the communications are routed towards the MNO core network through the high-speed IP connection of the ISP wire-based or optical network instead of being routed via the MNO network radio interface, which may sometimes be full loaded in the very dense coverage areas.

Moreover, the implementation of femtocells is extremely simple, insofar as these latter use only pre-existing infrastructures, both at the ISP and at the MNO, and can be installed by simple connection or plugging of a "femtomodule" to the ISP box (in the following of the description, by way of simplification, the term "femtocell" will simply be used to denote also this module).

The femtocells are usually of the "closed" type, i.e. the Internet box owner has to declare to the MNO the mobile phone numbers that are allowed to connect to the femtocell linked to his box, the allowed numbers being for example identified by keys contained in their SIM/USIM card, as the IMSI subscriber identifier. When the MNO receives/emits a call or a message from/to one of these numbers, if the user is not located in a macrocell of the network, the MNO will know a priori to which femtocell(s) this user is liable to be coupled. The latter may hence be easily found in the network, and also geographically located because the femtocells are connected to boxes fixedly installed at a place that is known (by the ISP), i.e. the termination of the xDSL or FTTH line used.

The invention aims, on the contrary, the implementation of a femtocell network of the "open" type, i.e. in which any subscriber of the MNO is liable to be coupled to a femtocell near which it is located, with no previous registration by the box owner and transparently for the latter.

Conversely to a closed network in which the femtocell serves only the needs of the subscriber that has installed it, on an open network, it is not possible to precisely locate calls or SMSs, whether they are emitted from a mobile phone located nearby this femtocell or to such a mobile phone.

Indeed, the only possible location in the absence of particular measurements would be that given by the "Service Areas" (SA) defined by the 3GPP specifications. These service areas may gather a relatively high number of cells as a function of their geographic situation and of a particular "service" allocated to this area: for example, the sector of intervention of a police unit, a fire brigade, etc. The 3GPP specifications allow only a limited number of such service areas per "Location Area" (LA), a location area being itself able to cover a very extended area such as a department, a big city or only a part of a big city.

Such techniques for locating a terminal connected to a femtocell in an open-type network are exposed in particular in the EP 2 252 114 A1 and US 2011/0053609 A1.

Unlike the geolocation information (geographic position of the antenna) available to the MNO in the case of a macrocell of its network, a rough location by location area/service area would be insufficient, insofar as it would not be possible to know the precise address from which the call or the message would have been emitted or to which it should be routed.

But this information must imperatively be able to be provided by the MNO within the framework of an official requisition from public authorities. Such a requisition indeed imposes the communication of the data contained in the "charging ticket" or CDR (Call Detail Record) recording all the information relative to a specifically identified phone call. This ticket contains the identities of the calling party and of the called party, the date and hour of the call, its duration, the type of call (voice, SMS, etc.) and, in the case of a call via a mobile network, the fine location of the calling party and/or of the called party.

In the case of a macrocell network, this location will be a geolocation by the latitude and the longitude of the antenna of the relay (BS or eNodeB) of the mobile network through which the call has transited.

In the case of a femtocell network operating as a closed network, this location will be possible from the previous declaration the Internet network owner will have made to the MNO regarding the users allowed to use the femtocell connected to his box.

On the other hand, in the case of a communication via an open-network femtocell, this direct identification is not possible, as the MNO is not capable to identify the femtocell precisely involved in the communication and does not know its geographic position, this information being the matter of the ISP that has provided the Internet box to which is connected the femtocell.

Such is the problem of the invention, which proposes a new method for locating the place where a short message (SMS)-recipient mobile is located, when this mobile is coupled to a femtocell operating in open mode (i.e. liable to transmit calls towards a phone of any subscriber of the MNO), wherein this method must be able to provide to the MNO:

not only a rough location (identification codes of the service and location areas, SAC and LAC, where the SMS recipient is located), but also a fine location allowing to precisely identify the Internet box used for this communication, this box being for example identified by its IP address and/or by precise geographic information such as the INSEE code (numerical code of the official nomenclature of French communes) of the place where the box is located, i.e. the place of location of the termination of the wire-based or optical xDSL/FTTH line.

As will be seen, the method of the invention allows to obtain this fine location in any circumstances, whoever is the subscriber of the mobile network using the femtocell, and without the owner of the Internet box to which is connected this femtocell has to do any previous declaration.

The location method of the invention can hence be applied to any mobile subscriber, even simply "passing through" near the femtocell, and in a fully transparent manner for both this subscriber and the Internet box owner.

In other words, the mobile subscriber will not even be aware of the fact that he uses as a relay a nearby femtocell and not an antenna of the macrocellular network, nor of the fact that the use of this femtocell has triggered a process of fine location of the femtocell.

More precisely, the invention proposes a method for locating a mobile user equipment that is the recipient of a short message SMS in a telecommunication network comprising a MNO mobile network and an ISP fixed network. The mobile network comprises a core network with a switching centre and a subscriber database, an SMS storage centre and a location platform. The fixed network comprises a fixed core network and a plurality of individual boxes forming termination equipment of the fixed network, with for each of them unique box identification data. Some of the boxes are provided with a short-range cellular emitter/receiver module of the femtocell type allowing a temporary wireless coupling with a nearby mobile user equipment.

The mobile network is organized into a plurality of location areas (LA) each identified by a location area code, and each location area gathers a set of service areas each identified by a service area code, each service area gathering a geographically homogeneous set of cells of the mobile network.

The femtocells operate in open mode, each femtocell of the mobile network being able to be coupled to any user equipment registered with the mobile network operator and being nearby the femtocell, without this user equipment has been previously registered in the individual box.

The arrival of an SMS intended to a user equipment coupled to a femtocell triggers a sequence comprising the following steps:

a) receipt by the mobile network of the SMS comprising SMS-recipient information, and interrogation of the subscriber database to identify the switching centre;
b) sending by the SMS storage centre to the location platform of a user equipment location request;
c) sending by the location platform to the switching centre of a rough location request;
d) sending by the switching centre to the location platform of a rough location comprising the service area codes and location area codes corresponding to the femtocell.

Characteristically of the invention:
at least one of the location areas comprises specific additional service areas in which are gathered femtocell identifiers; and
said sequence of steps further comprises the following subsequent steps:

e) determination by the location platform whether the location area corresponds or not to one of said specific additional service areas in which are gathered femtocell identifiers;
f) in the affirmative, sending by the location platform to the femtocell, via the switching centre, of a fine location request message;
g) obtaining by the switching centre from the femtocell of a fine location comprising unique data of identification of the box associated with the femtocell; and
h) transmission of the fine location by the switching centre to the SMS storage centre.

The sequence may further comprise the following final step:
i) generation, by the SMS storage centre, of an SMS data ticket added with the unique box identification data.

The procedure for locating the recipient subscriber advantageously comprises, at step f), the sending by the location platform to the switching centre of a PSL message according to the 3GPP specifications, step h) comprising the sending, as an answer, by the switching centre to the location platform, of a PSL_Ack message according to the 3GPP specifications, and the transmission by the location platform to the SMS storage centre of a TCP_Request_Location_Ack message according to the 3GPP specifications.

The unique box identification data may in particular comprise the IP address associated with the box and a geographic code of the place of location of the box.

The fine location request message may be in particular a Location Reporting Control message according to the 3GPP specifications and the answer message, a Location Reporting message according to the 3GPP specifications.

Very advantageously, the unique box identification data are encapsulated in the Location Reporting message by substitution of these data for the geographic longitude/latitude coordinates.

An exemplary embodiment of the present invention will now be described, with reference to the appended drawings in which the same references denote identical or functionally similar elements through the figures.

FIG. 1 schematically illustrates the various networks involved in the implementation of a call emitted or received through a femtocell.

Figure 2:
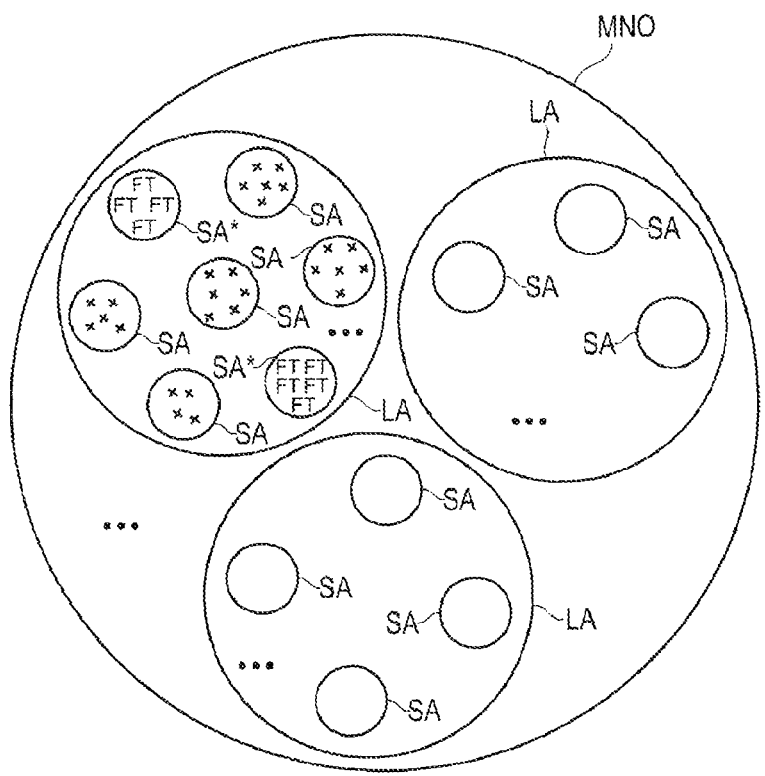

FIG. 2 symbolically shows the geographic gathering of the cells of a mobile telecommunication network into service areas, themselves gathered into a limited number of location areas.

Figure 3:
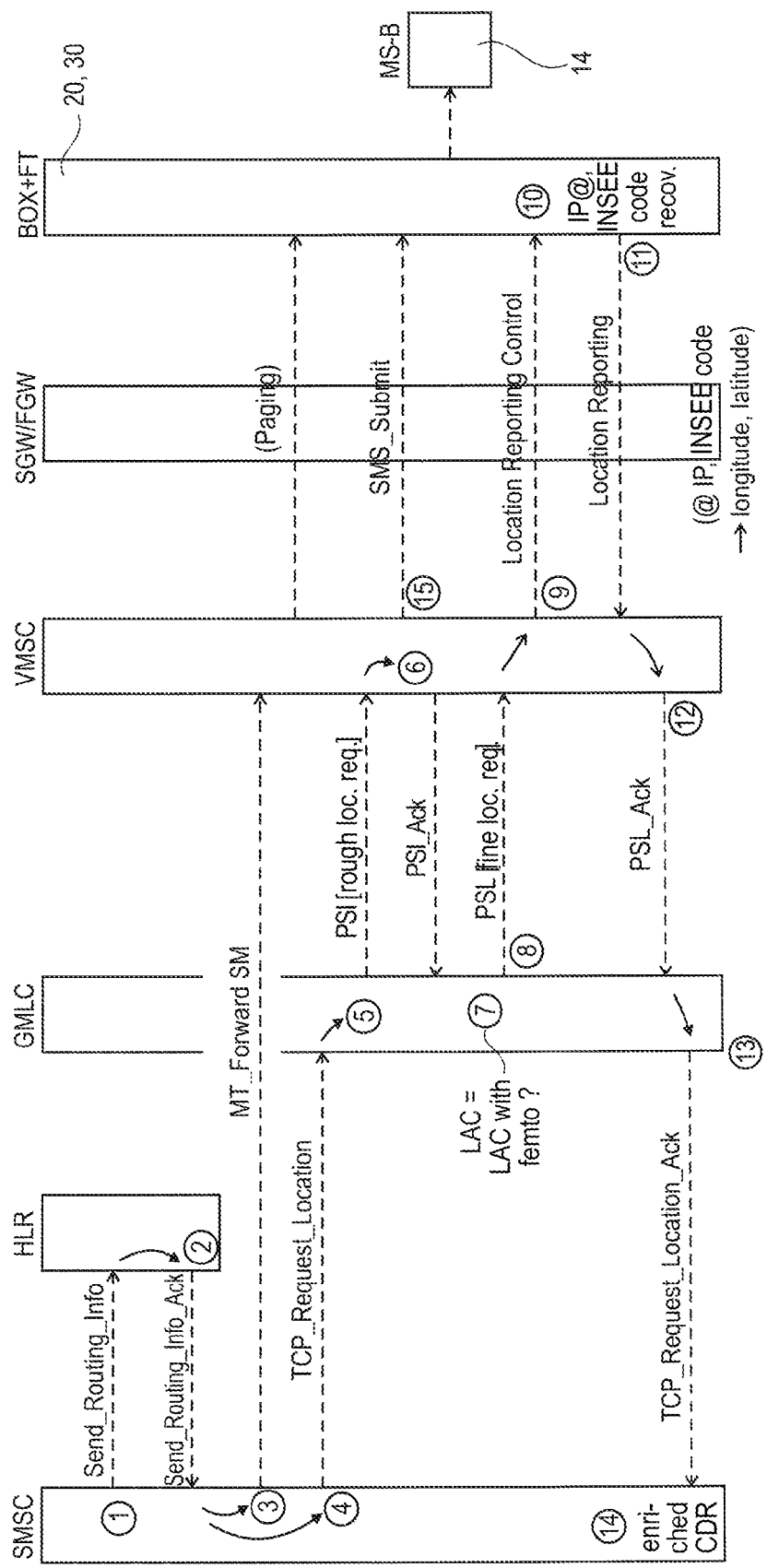

FIG. 3 is a schematic representation of the various entities of the network involved by the implementation of the location method according to the invention, showing the various messages and data exchanged between these entities.

An exemplary embodiment of the invention will now be described.

The invention will be described within the framework of a cellular network of the UMTS type, as defined by the 3GPP specifications, supposed to be known by the one skilled in the art.

By way of introduction, let's specify that, in the present invention and in the drawings, we will use the abbreviations (SAC, LAC, VMSC, CDR, etc.) and the designations (Location Reporting, Security Gateway, etc.) referring to concepts and elements defined and explained by these 3GPP specifications, and that, for this reason, these abbreviations and designations will be kept as such and won't be described in more detail than necessary.

FIG. 1 schematically illustrates the various networks involved in the implementation of a call emitted or received through a femtocell.

This set comprises a mobile telecommunication cellular core network 10 managed by a mobile network operator MNO, with a plurality of antennas 12 each defining a macrocell of a base station eNodeB, antennas to which the user of a mobile phone 14 (MS, Mobile Station) may be coupled by a wireless radio link 16.

The set also comprises a fixed telecommunication network of an Internet service provider ISP with an ISP core network 18 and a set of fixed Internet boxes (20) (denoted BOX) connected to the core network by fixed IP links 22, which are wire-based links of the xDSL type or optical links of the FTTH type.

An example of Internet box is the equipment distributed by the operator Free, Paris, France, under the name Freebox Crystal or Freebox Revolution Server. It is a multifunction interface box including an ADSL/FTTH modem and implementing functions of telephony, IP network (by Ethernet wire-based network or Wi-Fi wireless network) and television.

The Internet box 20 may be conventionally connected to one or several computers 24, to a television set 26, to a phone set 28, etc. Besides, this box is liable to receive a femtocell-type module 30 (referred to as FT) of low power and reduced range allowing a wireless radio coupling 32 with a mobile phone 14 located nearby.

As explained in introduction, the femtocell 30 is a micro-base station that is functionally equivalent, on the mobile phone side, to a base station 12 of the external macrocellular network. The difference resides in the fact that, on the operator side, this femtocell 30 plays the role of a gateway to the wire-based or optical fixed IP network of the ISP to allow the access to the MNO services from the high-speed Internet fixed network.

The femtocell is considered by the MNO as a fully-fledged cell (equivalent to an eNodeB) allowing, for example, to route via the IP network a voice call towards the switched network.

FIG. 2 symbolically shows the geographic gathering of the cells of a mobile telecommunication network into service areas, themselves gathered into a limited number of location areas.

More precisely, the cells of the MNO network are distributed between several "Location Areas" (LA) according to the 3GPP terminology. Each LA is generally implemented by an individual server, and gathers all the MNO cells located in a geographically homogeneous region, for example a French department or a big city or a sector of a big city. Each LA is identified by a LAC (Location Area Code) that is unique within the network.

Inside each LA, the cells are themselves gathered into "Service Areas" (SA) according to the 3GPP terminology, each SA being identified by a SAC (Service Area Code) that is peculiar to it and that is unique within a same LA.

The SAs are typically adapted, according to the 3GPP specifications, to gather cells allocated to i) a given service—for example an emergency service such as a police unit or a fire brigade—ii) located in a geographically homogeneous area—for example the area of intervention of a given police unit or a given fire brigade.

Characteristically of the invention, for the implementation of a network with open femtocells, the concept of the service area (SA) provided by the 3GPP specifications is used by adding to the existing SAs in a given LA (SAs that hence correspond to the macrocells of the network) additional SAs, dedicated to the femtocells. These dedicated SAs, denoted SA* in FIG. 2, contain only femtocell (FT) identifiers and gather the femtocells in an homogeneous manner based on their geographic location, which is the physical location of the Internet box associated with this femtocell.

The allocation of a femtocell to any service area SA* is operated once and for all during the installation of the femtocell in the Internet box: during this preliminary step, the femtocell identity is transmitted to the MNO at the same time as that of the Internet box, with its geographic location, and the MNO then allocates the femtocell to the service area SA* that is the geographically nearest thereto.

Hence, it will be possible to make a first, rough location of a given femtocell by the SAC+LAC codes that correspond thereto in the network topology.

This first location is however insufficient. In particular, it does not allow to respond to the demands of the national authorities in case of official requisition demanding the communication of the precise place from which a call or an SMS has been emitted, or towards which a call or an SMS has been routed.

Indeed, the SAC being coded over two bytes, it is not possible to have more than 65 535 SAs per LA. It is hence not conceivable to provide as much SAs as there are femtocells present in the network (which would have solved the problem of fine location), and several femtocells have imperatively to be gathered in a reduced number of SAs, hence each containing a high number of femtocells.

The method of the invention however allows the mobile network to determine the fine location required, at the time of routing of an SMS towards a mobile phone coupled to a femtocell, as will be explained hereinafter with reference to FIG. 3.

In FIG. 3 are shown the various entities involved by this process, with:
  the mobile phone MS-B of the SMS-recipient subscriber "B" (phone identified by the MSISDN-B number);
  the unit formed by the Internet box BOX and the femtocell FT connected to the latter;
  on the MNO side:
    the Short Message Service Centre SMSC, which ensures in particular the centralisation of the SMSs intended to subscribers of the mobile network, the temporary storage of these SMSs and their distribution to these subscribers;
    the Home Location Register HLR database, which memorises in particular, for each subscriber's MSISDN, the IMSI thereof (international number memorised in the USIM module of the MS terminal) and a certain number of information elements defining the profile of this subscriber as well as its location in the network, in particular the last known position of this subscriber, with identification of the corresponding VMSC;
    a Gateway Mobile Location Centre GMLC platform, whose function is to receive and process location requests that are submitted thereto by the core network, in particular from the VMSC, such location requests being as the case may be processed by means of other entities of the network;
    the Visited Mobile Switching Centre VMSC, which is the entity in charge of the communication routing in the network and of the interconnection with the other, mobile or fixed networks; and
    the Security Gateway/Femto Gateway SGW/FGW, which ensures the interfacing of the mobile network with the femtocells, for the access and security functions. In particular, when an Internet box is reset, the SGW gateway recognizes that a femtocell has been installed on this Internet box and memorizes the characteristics of this femtocell.

Upon receipt of an SMS arriving on the MNO network, the SMSC interrogates the HLR subscriber database through a Send_Routing_Info message, with as a parameter the MSISDM of the SMS-recipient subscriber B (step #1).

As an answer, the HLR sends back to the SMSC (step #2) a Send_Routing_Info_Ack message with the subscriber profile information, as well as the VMSC to which is connected, at a given time, the mobile phone MS-B of the recipient, such information being memorized in the HLR database.

At this stage, the core network knows about the situation of the SMS recipient only the identity of the concerned VMSC, which gives no real location information, even very rough, because, even when a MNO manages several VMSC, these latter do not really correspond to geographic areas.

Upon receipt of the Send_Routing_Info_Ack message, the SMSC will begin, concurrently, two series of actions:
the routing of the SMS towards the VMSC (MT_ForwardSM, step #3), a procedure that is conventional and that is not modified within the framework of the invention; and
a procedure, specific of the invention, of rough and fine location request in the case where the recipient mobile phone is coupled to a femtocell (a particularity that has not yet been determined).

This location request procedure is started by the sending towards the location platform GMLC of a location request (step #4) as a TCP_Request_Location message containing in particular:
the MSISDN-B and IMSI-B identifiers of the SMS recipient,
the identifier of the VMSC through which the SMS will have to transit, and
the SMS identifier, which is allocated to the SMS as soon as it is presented on the SMSC.

To obtain the rough and fine femtocell location information (in the case where the SMS has to transit through such a femtocell, which remains to be determined), the GMLC sends to the concerned VMSC (i.e. that whose identity is indicated in the TCP_Request_Location message) a rough location request (step #5) by a message of the PSI (Provide Subscriber Information) request type, with as a parameter the IMSI-B identifier of the SMS recipient.

As an answer, the VMSC sends to the GMLC platform (step #6) a PSI_Ack message for acknowledging the PSI request, this PSI_Ack message containing a LAI (Location Area Identity) field containing the PLMN identifier of the network and the LAC and SAC codes identifying the LA and SA areas of the SMS-recipient cell. Indeed, these LAC and SAC are known by the VMSC insofar as the subscriber using the recipient mobile phone MS-B has necessarily recorded his location with the network when he has switched his apparatus on, and its last position is hence known by the SGW/FGW gateway and the VMSC.

Upon receipt of the PSI_Ack message containing the rough location data, LAC/SAC, the GMLC platform then tests (step #7) whether the LAC is a specific LAC gathering femtocells or not.

In the affirmative, the GMLC platform sends (step #8) to the VMSC a fine location request, as a PSL (Provide Subscriber Location) request.

Upon receipt of this PSL request, the VMSC sends (step #9) to the femtocell a Location Reporting Control request (according to the 3GPP specifications), i.e. a request for fine location of the concerned cell.

In parallel, a paging control message is sent to the mobile phone MS-B via the femtocell so as to activate the latter and to put it in a state in which it will be able to receive the SMS.

Upon receipt of the Location Reporting Control request, the femtocell collects (step #10):
the IP address of the Internet box (which, by way of convenience, has been memorized once and for all in the femtocell at reset of the latter after insertion into the Internet box). This IP address allows in particular to find if necessary the physical address and the identity of the subscriber of the ISP owner of the Internet box; and
the INSEE code of the place where the Internet box (and hence the femtocell) is located. This element of information is known by the ISP because it knows where is located the termination of the wire-based or optical fixed line to which is connected the Internet box, and this element of information had been transmitted to the Internet box at the initialization or the reset of the latter.

These two elements of information, IP address and INSEE code, are transmitted to the VMSC (step #11) by encapsulation in a Location Reporting message (according to the 3GPP specifications), instead of the geographic latitude and longitude coordinates of position of the antenna of the base station, which would have been the information normally transmitted in a conventional Location Reporting message coming from an eNodeB station of a macrocell.

This technique of encapsulation of the information specific to the femtocell instead of the information of conventional geolocation of an antenna of the network allows to use, without modification, the conventional messages and protocols provided by the specifications, hence with no change at the layers of protocol management, conformity control, packet verifications, etc., within the networks involved by this procedure, both the ISP network and the MNO network.

Of course, other location information, known or obtained within the Internet box or the femtocell, may be used as a variant or as a complement of those mentioned in the present example (IP address and INSEE code).

Upon receipt of the Location Reporting message containing the data relating to the femtocell, the VMSC will transmit (step #12) this fine location information (IP address+INSEE code) to the GMLC platform by incorporating them in a PSL_Ack (Provide Subscriber Location Acknowledgment) message, which constitutes an answer to the PSL message of fine location request previously emitted by the GMCL at step #8.

This information is finally transmitted to the SMSC (step #13) by incorporating them in a TCP_Request_Location_Ask message. Based on this information, the SMSC will be able to generate (step #14) an enriched "charging ticket" or CDR (Call Detail Record), including in particular:
recipient number,
origin number,
SMS emission timestamp,
rough (SAC+LAC) and fine (IP address+INSEE code) location of the femtocell where the recipient subscriber B is located.

In the meantime, the SMS has of course been routed to its recipient (SMS_Submit, step #15), in a conventional manner, via the ISP subscriber Internet box and the femtocell coupled to the mobile of the recipient of this SMS.

The invention claimed is:
1. A method for locating a mobile user equipment that is the recipient of a short message SMS in a telecommunication network comprising:
a mobile network of a mobile network operator comprising:

a core network with a switching centre and a subscriber database;
an SMS storage centre; and
a location platform, and
a fixed network of an Internet service provider, comprising a fixed core network and a plurality of individual boxes forming termination equipment of the fixed network, with unique box identification data for each box,
some of these boxes being provided with a short range cellular emitter/receiver module of the femtocell type allowing a temporary wireless coupling with a nearby mobile user equipment,
in which method:
the mobile network is organized into a plurality of location areas each identified by a location area code;
each location area gathers a set of service areas each identified by a service area code, each service area gathering a geographically homogeneous set of cells of the mobile network;
the femtocells operate in open mode, each femtocell of the mobile network being able to be coupled to any user equipment registered with the mobile network operator (MNO) and being nearby the femtocell, without this user equipment has been previously registered in the individual box; and
the arrival of an SMS intended to a user equipment coupled to a femtocell triggers a sequence comprising the following steps:
a) receipt by the mobile network of the SMS comprising SMS recipient information, and interrogation of the subscriber database to identify the switching centre;
b) sending by the SMS storage centre to the location platform of a user equipment location request;
c) sending by the location platform to the switching centre of a rough location request; and
d) sending by the switching centre to the location platform of a rough location comprising the service area codes and location area codes corresponding to the femtocell;
said method further comprising:
at least one of the location areas comprises specific additional service areas in which are gathered femtocell identifiers; and
said sequence of steps further comprises the following subsequent steps:
e) determination by the location platform whether the location area corresponds or not to one of said specific additional service areas in which are gathered femtocell identifiers;
f) in the affirmative, sending by the location platform to the femtocell, via the switching centre, of a fine location request message;
g) obtaining by the switching centre from the femtocell of a fine location comprising unique data of identification of the box associated with the femtocell; and
h) transmission of the fine location by the switching centre to the SMS storage centre;
i) generation, by the SMS storage center, of an SMS data ticket added with the unique box identification data, wherein the unique box identification data comprise the IP address associated with the box and a geographic code of the place of location of the box.

2. The method of claim 1, wherein:
step f) comprises the sending by the location platform to the switching centre of a PSL message according to the 3GPP specifications, and
step h) comprises the sending, as an answer, by the switching centre to the location platform, of a PSL_Ack message according to the 3GPP specifications.

3. The method of claim 2, wherein:
step h) further comprises the transmission by the location platform to the SMS storage centre of a TCP_Request_Location_Ack message according to the 3GPP specifications.

4. The method of claim 1, wherein the fine location request message is a Location Reporting Control message according to the 3GPP specifications and the answer message is a Location Reporting message according to the 3GPP specifications.

5. The method of claim 4, wherein the unique box identification data are encapsulated in the Location Reporting message by substitution of these data for the geographic longitude/latitude coordinates.

* * * * *